(12) United States Patent
Shinomiya et al.

(10) Patent No.: US 7,344,371 B2
(45) Date of Patent: Mar. 18, 2008

(54) ROLLED CONED MANUFACTURING APPARATUS

(75) Inventors: Yasuo Shinomiya, Osaka (JP); Toshitaka Haruta, Osaka (JP)

(73) Assignee: Nissei Kabushiki Kaisha, Osaka (JP)

( * ) Notice: Subject to any disclaimer, the term of this patent is extended or adjusted under 35 U.S.C. 154(b) by 62 days.

(21) Appl. No.: 10/522,012

(22) PCT Filed: Jul. 25, 2002

(86) PCT No.: PCT/JP02/07535

§ 371 (c)(1), (2), (4) Date: Jan. 21, 2005

(87) PCT Pub. No.: WO2004/010787

PCT Pub. Date: Feb. 5, 2004

(65) Prior Publication Data

US 2005/0260315 A1 Nov. 24, 2005

(51) Int. Cl.
*B28B 11/00* (2006.01)
(52) U.S. Cl. ............... 425/398; 425/348 R; 426/139; 426/143; 426/501; 99/383
(58) Field of Classification Search ............ 425/451.6, 425/442, 438, 398, 422, 418; 426/138, 139, 426/143, 501–503; 493/71–73, 408; 99/383
See application file for complete search history.

(56) References Cited

U.S. PATENT DOCUMENTS 1,440,851 A * 1/1923 Tatosian .................. 425/334
1,720,304 A * 7/1929 Taylor .................... 425/214
4,589,838 A * 5/1986 Ziegler .................... 425/540
4,624,855 A   11/1986 Haas, Sr. et al.
5,336,511 A * 8/1994 Der Beek ................ 426/138
5,753,292 A   5/1998 Haas (Continued)

FOREIGN PATENT DOCUMENTS

JP    61-87079 (U)    6/1986

(Continued)

OTHER PUBLICATIONS

Japanese Office Action date Mar. 6, 2007 w/English translation.

(Continued)

*Primary Examiner*—Yogendra N. Gupta
*Assistant Examiner*—Maria Veronica Ewald
(74) *Attorney, Agent, or Firm*—Harness, Dickey & Pierce, P.L.C.

(57) ABSTRACT

A concave half (10) having a conical inside and a convex half (20) having a conical outside and being fitted therein are fitted in each other. An openable and closable, loop-shaped supporting means as a toggle-jointed link (30) rotatably supports and pushes a cylindrical part (23) of the convex half (20) onto the axis on at least three points on the outer periphery of the cylindrical part (23), with an axis of the concave half (10) and an axis of the convex half (20) being aligned with each other when the supporting means is closed. The toggle-jointed link (30) is openable and closable, wherein a plurality of rolling objects such as rollers (31) are provided inside the loop, thereby improving function as a bearing of the supporting means and efficiently manufacturing quality rolled cones (40).

11 Claims, 15 Drawing Sheets

U.S. PATENT DOCUMENTS 6,227,103 B1 * 5/2001 Haas et al. .................. 99/354

FOREIGN PATENT DOCUMENTS

| | | |
|---|---|---|
| JP | 1-99180 | 7/1989 |
| JP | 03-053841 | 3/1991 |
| JP | 03-37880 | 4/1991 |
| JP | 4-169146 (A) | 6/1992 |
| JP | 2000-120659 | 4/2000 |
| JP | 2000-249080 | 9/2000 |

OTHER PUBLICATIONS

International Search Report, Sep. 2002.

* cited by examiner

GOOD

POOR

ROLLED CONED MANUFACTURING APPARATUS

TECHNICAL FIELD

The present invention relates to an apparatus for manufacturing rolled cones as a kind of edible container, especially to an apparatus for efficiently manufacturing quality rolled cones.

BACKGROUND ART

Cone cups have been known as a container for serving frozen confectionery such as soft ice cream (soft-serve ice cream), hard ice cream, and other confectionery including chocolate or cream. Cone cups are made from a mixture of starchy raw materials such as flour and cornstarch, adding sugar and food additives accordingly, which is baked into a cup shape, filled with various confectioneries, for example, frozen confectionery, and eaten therewith.

A cone cup is a lightly baked confectionery like a wafer having a good mouth feel and serving as a wafer or a cookie for a relief in eating frozen confectionery. In addition, cone cups are often used for serving soft ice cream, since the aroma enhances a flavor of frozen confectionery.

Various kinds of cone cups have been known, for example, rolled cones rolled into a conical shape after a mixture is baked into a sheet. Rolled cones are cone cups utilizing plasticity of sugar and having a characteristic texture like cookies, which are preferably used for serving not only soft ice cream but also hard ice cream. A material formed into a sheet before rolled up is hereinafter referred to as a material sheet.

An apparatus for manufacturing the above rolled cones includes a concave half (female mold/outside mold) having a conical-shaped inside and a convex half (male mold/inside mold) fitted in the concave half. The above concave half has a slit-type inlet to insert a baked material sheet into the inside. Then, the convex half is fitted in the concave half and rotated therein to roll up the material sheet and make a rolled cone. Therefore, the concave half is used as a guide to form the outlines where a rolled cone is rolled up.

For example, an apparatus disclosed in (A) "The Japanese Laid-Open Utility Model Application No. 61-87079/1986 (Jitsukaisho 61-87079 published on Jun. 7, 1986)", and an apparatus disclosed in (B) "The Japanese Laid-Open Patent Application No. 4-169146/1992 (Tokukaihei 4-169146 published on Jun. 17, 1992)", have been known as the above rolled cone manufacturing apparatus.

The manufacturing apparatus disclosed in the above (A) is a manually-operated apparatus, which moves a concave half with a convex half fixed. The manufacturing apparatus disclosed in the above (B) can automatically perform mass production, which moves a convex half with a concave half fixed and continuously provides a material sheet in the concave half through a remover.

To efficiently manufacture quality rolled cones, it is important to steadily roll up a material sheet and prevent any contact of the concave half with the convex half when both halves are fitted in. Therefore, in the above rolled cone manufacturing apparatus, it is necessary to align the axis of the concave half with the axis of the convex half.

More particularly, as shown in the FIGS. 11(*a*) and (*b*) and FIGS. 15(*a*) and (*b*), the rolled cone manufacturing apparatus includes a mold made up of at least a concave half 10 and a convex half 20. The concave half 10 has a conical shape at the inside and an opening part 11 at the bottom of the cone. In addition, at a side of the cone, a slit-type inlet 12 is formed to bring a material sheet into the inside. Furthermore, at a position leading to the inlet 12, for example, a plate-type stand 13 is provided. The convex half 20 has a conical-shaped outside to be fit in the concave half 10, wherein a spindle shaft 21 is installed at the bottom of the cone.

As shown in FIG. 11(*a*) and (*b*), when the convex half 20 is fitted in the concave half 10, a cavity 50 is formed between the concave half 10 and the convex half 20. As shown in FIG. 12(*b*), a part of the material sheet 41 is brought in the cavity 50 through the inlet 12, then, as shown in FIG. 12(*a*), a spindle shaft 21 of the convex half 20 is rotated in a direction of Arrow A in the figure by rotative means (not shown). Therefore, as shown in FIG. 12(*b*), the material sheet 41 moves to a direction of Arrow B in the figure (in the cavity 50). As shown in FIG. 13(*a*) and (*b*), the material sheet 41 is rolled up around the convex half 20 and is brought in the cavity 50.

Afterwards, as shown in FIG. 13(*a*), the convex half 20 is moved away from the concave half 10 (a direction of Arrow C in the figure), and as shown in FIG. 14(*a*), each of the halves is released from the fit position. Therefore, as shown in FIG. 14(*a*), the material sheet 41 rolled up with the convex half 20 is taken out from the concave half 10. As shown in FIG. 15(*a*) and (*b*), the convex half 20 passes through a detachment frame 25, so that the material sheet 41 rolled up around an outside of the convex half 20, i.e., a rolled cone 40 is detached in a direction of Arrow D in the figure. (Though the direction D is vertically downward in fact, the Arrow shows the left side in the figure.)

However, in the above conventional art, when the material sheet 41 is rolled up, the concave half 10 is only fitted in the convex half 20. Therefore, especially in mass production of rolled cones, misalignment of the axes of the respective halves is unavoidable.

More particularly, the concave half 10 and the convex half 20 serve as a mold for forming the cavity 50 when being coupled with each other. In other words, as shown in FIGS. 11(*a*) and (*b*) to FIGS. 15(*a*) and (*b*), the concave half 10 and the convex half 20 just face each other with a gap named the cavity 50 interposed therebetween. In this condition, if the convex half 20 rotates to roll up the material sheet 41 thereon, the concave half 10 and the convex half 20 are easily misaligned through the influence of rotation of the convex half 20. Misalignment causes unsteady rolling up, resulting in poor rolled cones 40.

This invention is intended to solve the above problem, to effectively avoid misalignment of the respective axes of the concave half and the convex half, and to provide an apparatus for efficiently manufacturing quality rolled cones.

DISCLOSURE OF INVENTION

To attain the above purpose, applicants of the present invention fully considered a method to align the axes of a concave half and a convex half, and learned and completed the present invention for preventing the misalignment of the axes, by using supporting means to support the convex half when it is fitted in the concave half.

Namely, to solve the above problem, a rolled cone manufacturing apparatus comprises a concave half and a convex half which form a cavity inside when combined with each other, a cross section of the cavity having a circular shape in a direction orthogonal to axes of the concave half and the convex half; and supporting means which rotatably support the convex half, on condition that the axis of the concave half is aligned with the axis of the convex half, said supporting means being openable and closable, and pushing, on at least three points, an outer periphery of a part of the convex half protruding from the concave half onto the axis, when said supporting means is closed.

In the above structure, the supporting means supports and pushes the convex half onto the axis on at least three points on the outer periphery of the convex half, thereby effectively avoiding misalignment of the axes of the halves, stabilizing roll-up condition of a material sheet, and preventing contact and damage of the halves. In the result, it is possible to effectively avoid misalignment of the axes of the concave half and the convex half and to efficiently manufacture quality rolled cones.

More particularly, for example, the above supporting means may be a structure of a loop-shaped member, a scissors-shaped member, a lever-type member, or a radial linear actuator, all of which are openable and closable.

For a fuller understanding of the nature and advantages of the invention, reference should be made to the ensuing detailed description taken in conjunction with the accompanying drawings.

BRIEF DESCRIPTION OF DRAWINGS

FIG. 11(a) is a fragmentary sectional top view of a conventional mold before a material sheet is brought in. FIG. 11(b) is a front view seen from an opening part of the concave half shown in FIG. 11(a).

BEST MODE FOR CARRYING OUT THE INVENTION

Embodiment 1

An embodiment of the present invention is explained below referring to figures. The present invention is not limited to this embodiment.

A rolled cone manufacturing apparatus in accordance with the present invention makes rolled cones in such a manner that a material sheet for baked confectionery is molded, (a first molding), and then the material sheet is rolled up using a mold made up of a concave half and a convex half (a second molding). Especially, the apparatus has supporting means that rotatably supports a spindle shaft of the convex half so that the respective axes of the convex half and the concave half are aligned with each other.

The above supporting means can be opened and closed, and supports and pushes an outer periphery of a part of the convex half protruding from the concave half onto the axis on at least three points in closed condition. For example, a loop-shaped member is preferably used in this embodiment.

Figure 2:
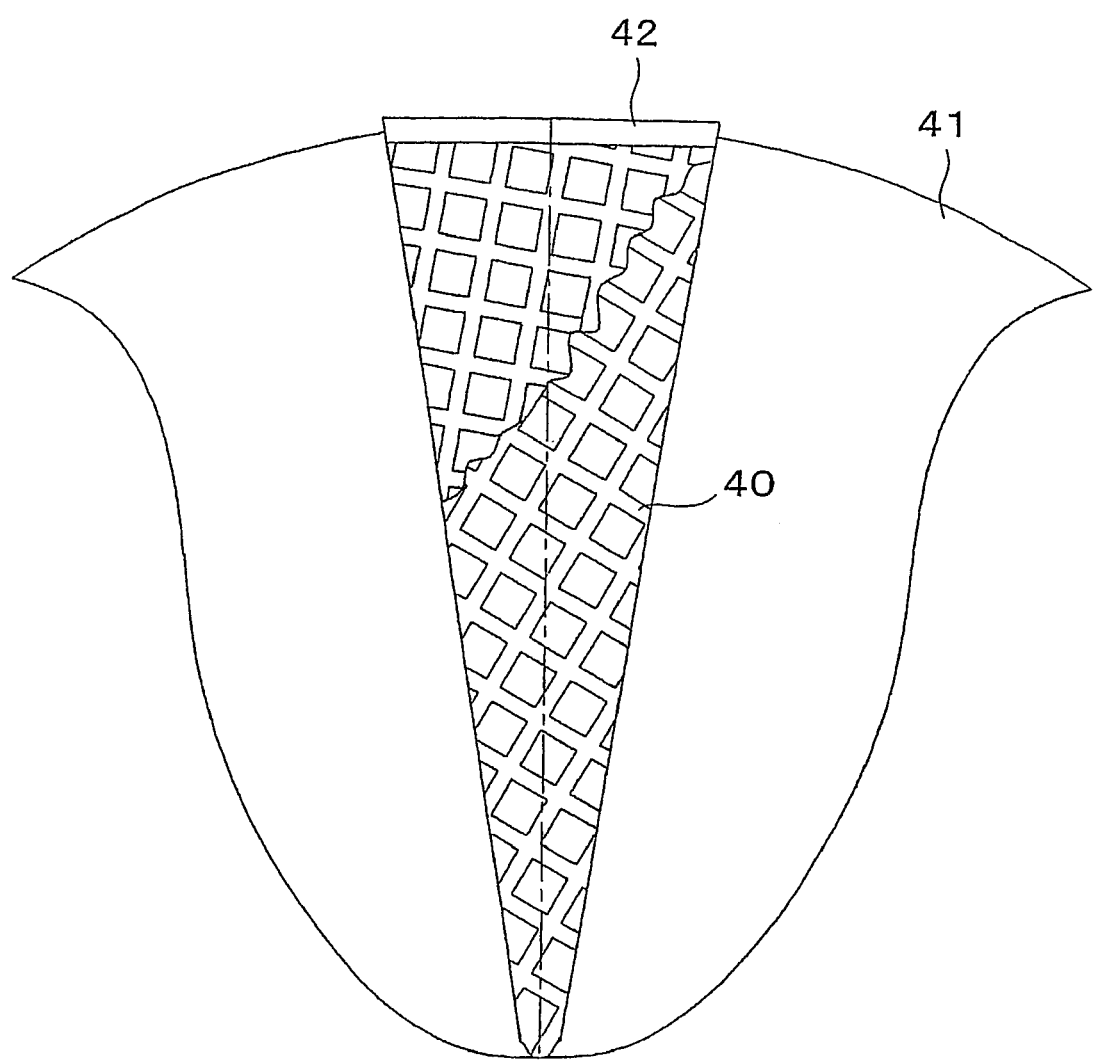
FIG. 2 is a comparative front view showing an example of a rolled cone manufactured by an embodiment of the present invention and showing an example of a material sheet before being subjected to a second molding and molded into a rolled cone.

In this embodiment, as shown in FIG. 2, a rolled cone 40 is produced by rolling up a material sheet 41 baked in a given fan shape, into a conical shape, using the rolled cone manufacturing apparatus.

Raw materials for the rolled cone 40 are not particularly limited. In general, a starchy and watery mixture is preferably used. This starchy and watery mixture includes starch as a main ingredient, various sub ingredients added depending on usage, and water added thereto and mixed.

Flour is typically used as starch of the main ingredient, but it is not particularly limited. Corn starch and other starch can be also used. Additionally, various additives such as seasonings including sugar and salt, edible oil and fat, emulsifiers, flavors, colors, stabilizers, swelling agents, thickening agents, flavor enhancers can be used as sub ingredients. These sub ingredients are selected depending on the kind and usage of the rolled cone 40 without particular limitation.

When preparing the above starchy and watery mixture, compound ratio of the main ingredient, sub ingredients and water, that is, compound ratio of the starchy and watery mixture is selected depending on the kind and usage of the rolled cone 40, without particular limitation. The starchy and watery mixture used in this embodiment may be dough including comparatively less water to give plasticity, or slurry including comparatively more water to give fluidity.

A manufacturing process of the rolled cone 40 includes two large processes: molding the raw materials into the material sheet 41 at first, and then rolling up into a conical shape. For convenience, in the descriptions below, molding the material sheet 41 is referred to as "a first molding" and rolling up the material sheet 41 after the first molding is referred to as "a second molding".

A method of the first molding is not particularly limited. A conventional method to mold raw materials into a sheet can be selected depending on raw materials. In this embodiment, as mentioned above, since the starchy and watery mixture is used, a method to bake (heat) raw materials into a sheet is generally utilized.

To bake the above starchy and watery mixture into a sheet, a mold for calcination is generally used, without particular limitation for the structure. A conventional metal mold for calcination can be preferably used. In addition, calcination conditions, typically temperature, are imposed depending on the kind of raw materials and the rolled cone 40 as a finished product, without particular limitation.

A shape of the above material sheet 41 is not particularly limited. However, to make a good-looking rolled cone 40 after rolling up into a conical shape, a shape of the material sheet 41 has to be designed in consideration of the rolling up. In this embodiment, as shown in FIG. 2, a fan-shaped material sheet is preferable. In addition, it is preferable that sides corresponding to radiuses of the fan are outwardly and protrusively expanded.

Figure 3:
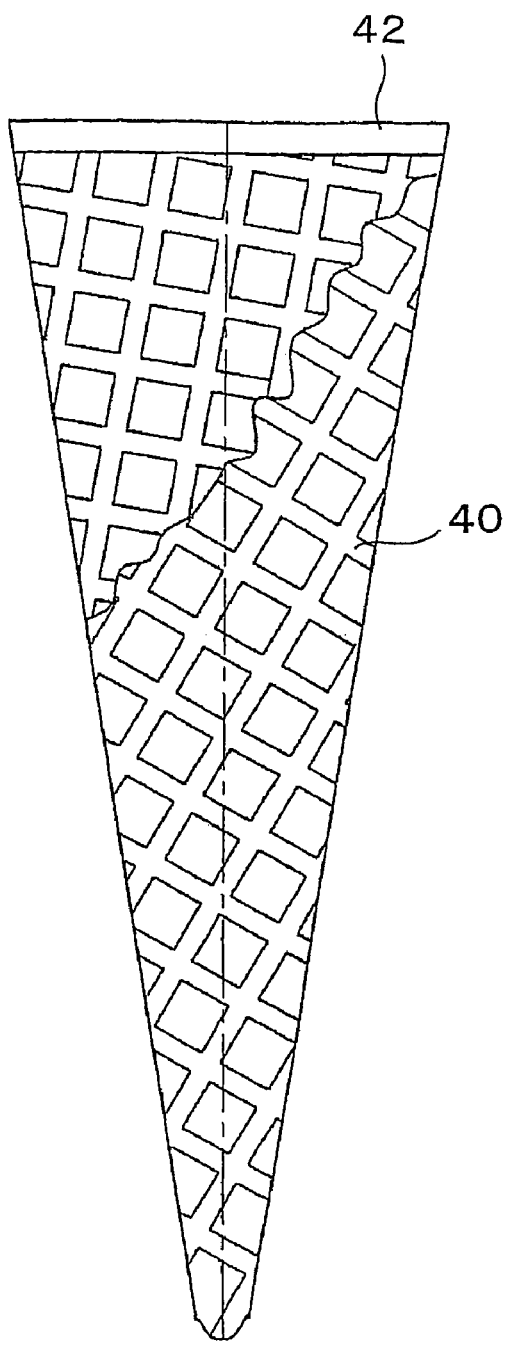
FIG. 3(a) is a front view showing an example of a good rolled cone shown in FIG. 2.
FIG. 3(b) is a front view showing an example of a poor rolled cone shown in FIG. 2.
Figure 3:
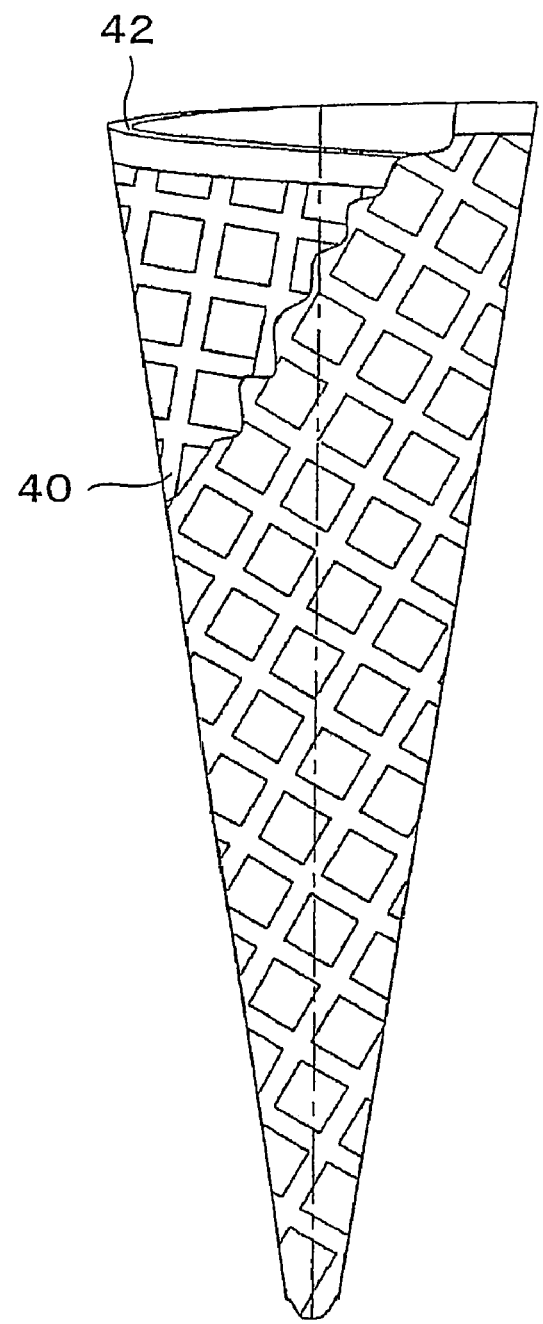

In case of the fan-shaped material sheet, as shown in FIG. 2 and FIG. 3(a), it is possible to almost level a bottom of the cone, that is, a rim of the open edge 42 of the rolled cone 40 after rolling up the material sheet. Additionally, when the sides corresponding to radiuses of the fan-shaped material sheet are outwardly and protrusively expanded, the material sheet is properly rolled up without a gap on the rolled cone 40. This realizes such a roll-up condition that the rolled cone functions more satisfactorily as a container.

Figure 4:
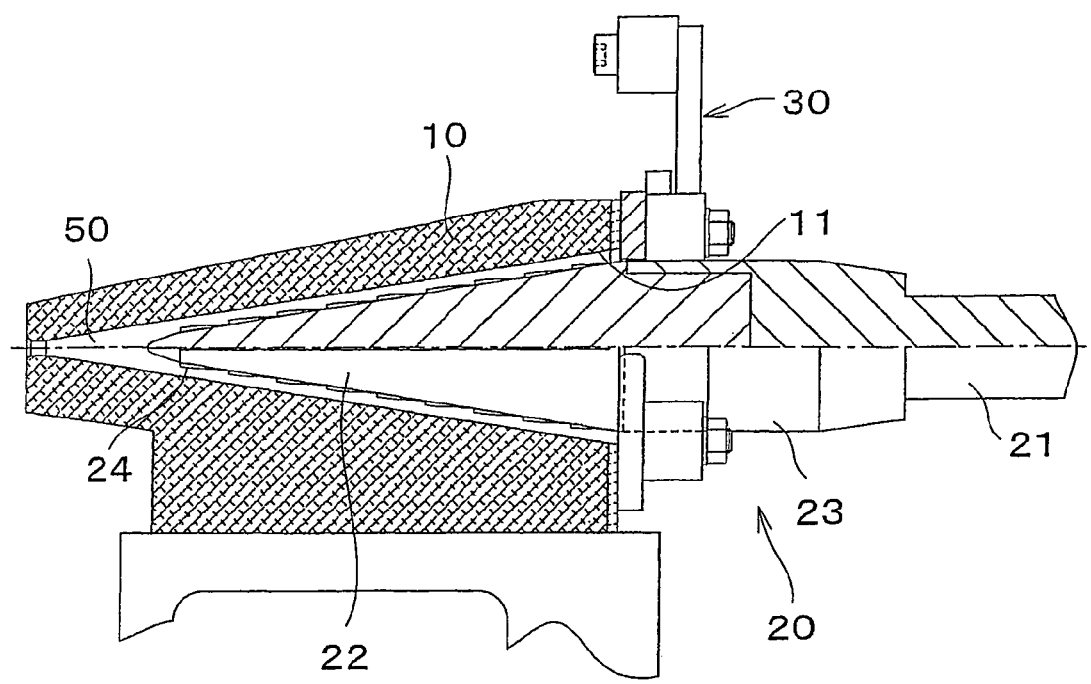
FIG. 4 is a partial side cross sectional view showing an example of a mold equipped with the toggle-jointed link shown in FIG. 1.

A roll-up mold for the second molding of the material sheet 41, that is, a mold used for rolling up the material sheet 41, for example, as shown in FIG. 4, includes at least a pair of concave half 10 and convex half 20.

Figure 1:
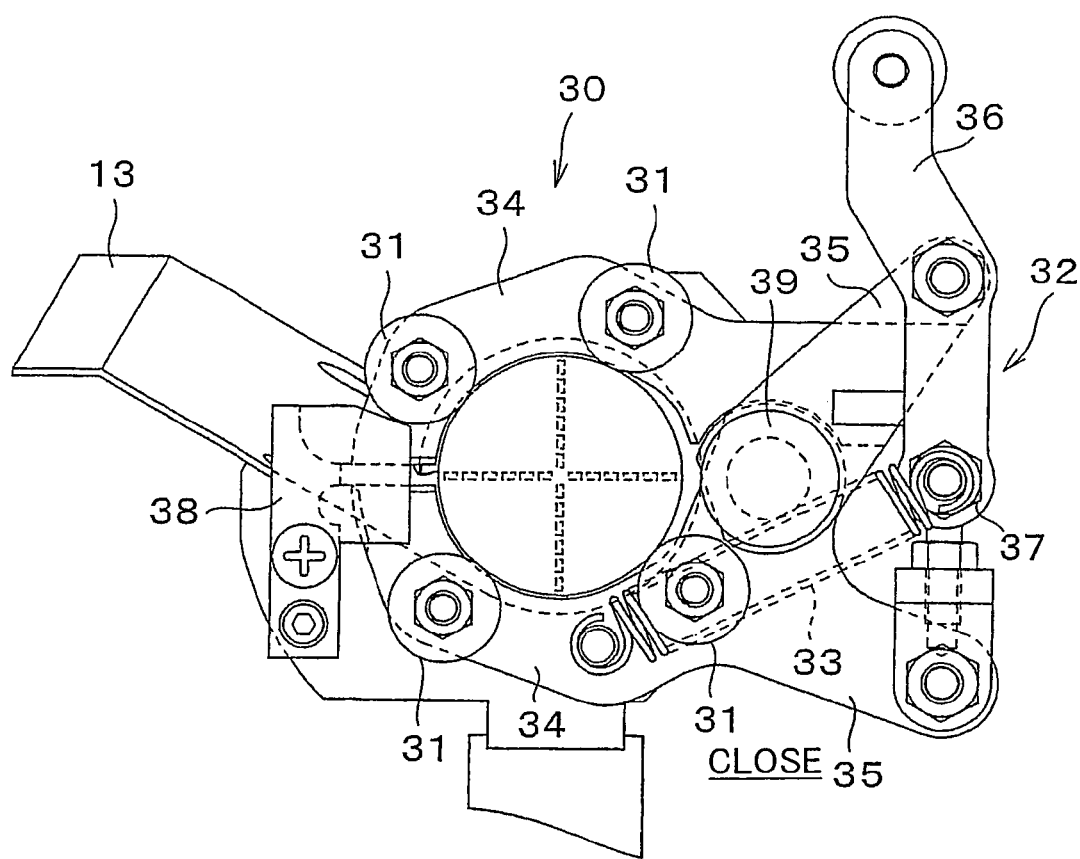
FIG. 1 is a front view showing an example of a toggle-jointed link (supporting means) in closed condition provided for a rolled cone manufacturing apparatus in accordance with an embodiment in the present invention.

In this embodiment, the concave half 10 has a conical-shaped inside and has an opening part 11 at the bottom of the cone. Also, at a part corresponding to a side of the cone, a slit-type inlet leading to the conical-shaped inside is provided. (Refer to FIG. 6 and FIG. 7.) At a position leading to the inlet 12, as shown in FIG. 1, for example, a plate-type stand 13 is provided. The material sheet 41 is placed on the stand 13, and then it is brought into the inside of the concave half 10 through the inlet. The convex half 20 has a conical-shaped outside and is fitted in the concave half 10 and has a spindle shaft 21 at the bottom of the cone.

At the opening part 11 of the concave half 10, a toggle-jointed link 30 is provided as supporting means described below. On a surface of the convex half 20, as shown in FIG. 4, claws 24 are provided to catch a surface of the material sheet 41 and roll it up smoothly. In addition, the convex half 20 includes a fitting part 22 perfectly held in the inside of the concave half 10 in a fitting condition, as well as a cylindrical part 23 outwardly protruding from the concave half 10 in a fitting condition. Also, at an opposite side of the fitting part 22, the spindle shaft 21 is provided. As described below, the convex half 20 is rotatably fixed on the cylindrical part 23 by supporting means.

In this embodiment, the above concave half 10 and the convex half 20 have a conical shape. However, the present invention is not limited to this. The concave half 10 and the convex half 20 may be a truncated cone shape leveled at an apex of the cone. In other words, the concave half 10 and the convex half 20 in the present invention have a "substantially" conical shape. In addition, the shape need not be always a substantially conical shape in which an area of a cross section orthogonal to the axis gradually varies. Namely, the concave half 10 and the convex half 20 in the present invention may have a cylindrical shape. Therefore, in the rolled cone manufacturing apparatus in accordance with the present invention, the mold may have any types of cylindrical shapes or substantially conical shapes on condition that a cross section orthogonal to the axis is circular in shape. In addition, in the present invention, the shape of the mold may be a combination of a conical shape, a truncated cone shape and a cylindrical shape. For example, the mold may be a cylindrical-conical combined shape having a cone at a tip of a cylinder, or a truncated cone-cylindrical combined shape in which a tip of a truncated cone expands as a cylinder. In this manner, the mold in the present invention may have various types of shapes as long as a cross section in the direction orthogonal to the axis is circular in shape.

The exact shape and size of the concave half 10 and the convex half 20 may be designed depending on size and variety of the material sheet 41 and the rolled cone 40 without particular limitation. Basically, as mentioned above, the inside shape of the concave half 10 and the outside shape of the convex half 20 are arranged such that a cross section orthogonal to the axis is circular in shape, and a cavity 50 is formed between the concave half 10 and the convex half 20 when being in fitting condition. A material used for the concave half 10 and the convex half 20 is not particularly limited. In the present invention, a metal mold made of conventional metals can be preferably used.

Note that, the axis of the concave half 10 is an extension of a cross-sectional centroid in the direction orthogonal to the axis of the spindle shaft 21 of the convex half 20. The axis of the convex half 20 is identical with the axis of the spindle shaft 21.

In the rolled cone manufacturing apparatus in accordance with the present invention, a part of the material sheet 41 is brought into the cavity 50 through the inlet. Subsequently, the spindle shaft 21 of the convex half 20 is rotated by a rotator described below (not shown). Thus, the material sheet 41 is rolled up on the convex half 20 and is held in the cavity 50. Then, the fitting of the halves is released and the rolled cone 40 is taken out. Consequently, a rolled cone 40 is manufactured.

In the second molding of the material sheet 41, the convex half 20 fitted in the concave half 10 is rotated to roll up the material sheet 41 and hold it in the cavity 50 between the halves. Misalignment in the fitting of the concave half 10 and the convex half 20 causes unevenness in the cavity 50 and the material sheet 41 cannot be rolled up smoothly and properly.

Misalignment in rolling up, as shown in FIG. 3(b), makes a rim of the open edge 42 of the rolled cone 40 uneven. The rolled cone 20 with the uneven rim of the open edge 42 may cause some troubles in a food serving process or may spoil the appearance of the rolled cone 40 and the food served.

More particularly, when serving, for example, a frozen confectionery on the rolled cone 40, a plurality of rolled cone 40 are piled up and placed on a cone dispensing apparatus. This apparatus provides the rolled cones 40 one by one for a frozen confectionery filling apparatus. If rims of the rolled cones 40 are uneven, claws for separating piled rolled cones 40 one by one do not properly function, causing a problem that the rolled cones 40 are cracked by the claws, or a plurality of rolled cones are dispensed at a time, so that the frozen confectionery may not be produced smoothly.

The above rolled cone 40 is an edible container serving a food and eaten with the food. The food served may be frozen confectioneries such as soft ice cream and hard ice cream, or other confectioneries such as chocolate and cream.

In many cases, the frozen confectioneries and other confectioneries are served as a dessert. A dessert is generally served after main dishes, or eaten independently of meals such as breakfast, lunch and dinner. In general, meals do not only satisfy one's appetite but also satisfy various other mental desires. Especially, confectioneries served as a dessert can more satisfy mental desires than main dishes. Therefore, an appearance of confectioneries is more important than that of main dishes. As shown in FIG. 3(b), the rolled cone 40 with an uneven rim of the open edge 42 may spoil the appearance and may give an impression as a poorly-made product.

Therefore, in manufacturing the rolled cones 40, it is necessary to effectively avoid misalignment in rolling up. The misalignment in the fitting of the concave half 10 and the convex half 20 is regarded as misalignment of the axes of the halves. Namely, since, in the second molding, the conical-shaped convex half 20 fitted in the conical-shaped concave half 10 rotates inside, misalignment of the axes of the halves results in a gap between the inner surface of concave half 10 and the outer surface of the convex half 20 (i.e., the cavity 50 is formed).

The misalignment of the axes obstructs smooth rolling up of the material sheet 41, resulting in a poor product. In some cases, the inside of the concave half 10 may contact the outside of the convex half 20, thereby damaging the halves.

The rolled cone manufacturing apparatus in accordance with the present invention thus has supporting means which supports the convex half 20 rotatably, with the axis of the convex half 20 aligned with the axis of the concave half 10. More particularly, in this embodiment, as shown in FIG. 1, the axis of the concave half 10 is aligned with the axis of the convex half 20 using loop-shaped supporting means.

The supporting means in the present invention is a loop-shaped, openable and closable member, which supports the convex half 20 at an inside of the loop, wherein a plurality of rolling objects contacting the surface of the convex half 20 are provided. In an example shown in FIG. 1, the loop-shaped supporting means is link-type means that is openable and closable by a toggle mechanism (link mechanism including toggle mechanism, hereinafter referred to as a toggle-jointed link 30), and rollers (rolling members) 31 are used as rolling objects.

The toggle-jointed link 30, as shown in FIG. 4, is fixed in the vicinity of the opening part 11 of the concave half 10. Therefore, it is possible to rotatably support the cylindrical part 23 of the convex half 20 protruding from the concave half 10 by the toggle-jointed link 30, with the convex half 20 being inserted through the opening part 11 of the concave half 10 and fitted in the concave half 10.

The supporting means in accordance with the present invention is a loop-shaped, openable and closable member such as the toggle-jointed link 30, and supports the convex half inside the loop. More preferably, a plurality of rollers 31 are provided inside the toggle-jointed link 30 as mentioned above.

Even though the supporting means does not have rolling objects such as the rollers 31, the supporting means can supports and pushes an outer periphery of the convex half onto the axis on at least three points, by directly contacting the outer periphery of the cylindrical part 23 of the convex half 20, so that the supporting means can support the convex half 20 fitted in the concave half 10. It is noted that, however, the supporting means directly contacting the surface of the convex half 20 without rolling objects also functions as a sliding bearing, on condition that the convex half 20 is supported.

When the supporting means functions as a sliding bearing, the rotary axis, i.e., the convex half 20 directly contacts the inner surface of the sliding bearing (supporting means), so that the inner surface and the surface of the convex half 20 are significantly wore away. In addition, since the width of the cavity 50 varies due to the wear, the roll-up condition of the material sheet 41 changes and hence the rolled cone 40 cannot be produced steadily.

Additionally, the wear of the inner surface of the supporting means causes misplacement in the supporting condition, thereby further causing misalignment of the axes of the concave half 10 and the convex half 20. Significant misalignment of the axes makes the roll-up condition of the material sheet 41 unsteady, and the concave half 10 becomes liable to contact the convex half 20, resulting in damages to the halves.

On the other hand, the toggle-jointed link 30 functions as a rolling bearing, in case that the toggle-jointed link 30 has rolling objects such as the rollers 31. Therefore, unlike the case of adopting a sliding bearing, the deviation in supporting due to the wear does not occur, resulting in more steady support.

Of course, it is needless to say that the rolling bearing is not always necessary depending on shape and conditions of use of the rolled cone manufacturing apparatus (or mold). Therefore, the supporting means in the present invention is a loop-shaped, openable and closable member that supports the convex half 20 inside the loop. It is more preferable that a plurality of rolling objects (rollers 31) contacting the surface of the convex half 20 are provided inside the loop.

In the present embodiment, the supporting means is the toggle-jointed link 30, however, the present invention is not limited to this. The supporting means may be any kinds of loop-shaped members on condition that the convex half 20 is rotatably but steadily supported and the supporting condition can be easily released. Preferably, as the toggle-jointed link 30, the supporting means is arranged to sandwich the convex half 20.

A shape of the rolling objects provided on the toggle-jointed link 30 is not particularly limited, and variously-structured conventional rolling bearings can be used, such as the rollers 31 and balls. Similarly, the material is not particularly limited. In general, metals are preferably used.

In this embodiment, as shown in FIG. 1, four rollers 31 support the cylindrical part 23 of the convex half 20. It is particularly preferable that the number of the rolling objects is three or more. When three points for supporting are determined in such a manner that the axis of the convex half 20 inscribes a triangle formed by points P (refer to FIGS. 9 and 10) for contacting the cylindrical part 23, the axis of the convex half 20 is fixed on one point. Accordingly, the periphery of the cylindrical part 23 of the convex half 20 is steadily supported with three rolling objects. The maximum number of the rolling objects is suitably determined in accordance with the size and shape of the rolling objects, the convex half 20, and the toggle-jointed link 30, and thus not being particularly limited.

Figure 5:
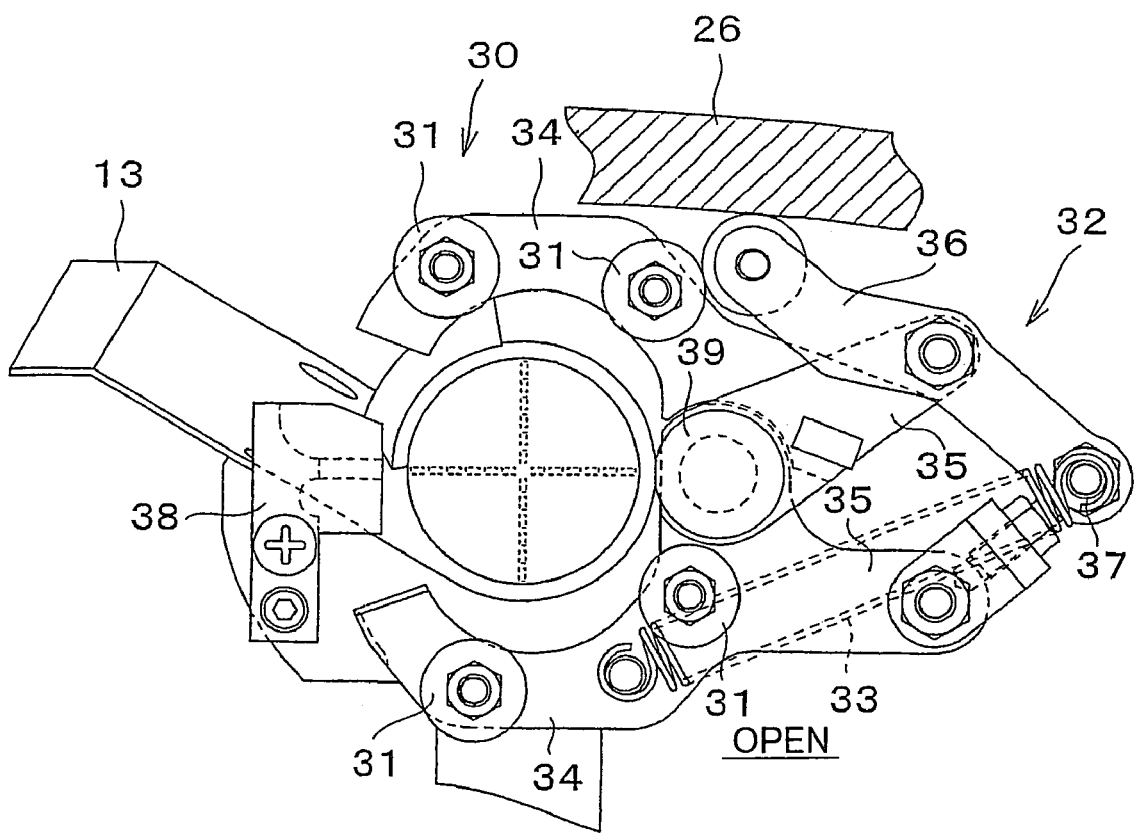
FIG. 5 is a front view showing the toggle-jointed link shown in FIG. 1 in open state.

In addition, it is very preferable that the toggle-jointed link 30, as shown in FIG. 1, includes opening and closing means that opens and closes the loop. In the example shown in FIG. 1, the opening and closing means is linked with the toggle-jointed link 30 and constitutes an opening and closing lever mechanism 32 pressed by an elastic member such as a spring 33. When the opening and closing lever mechanism 32 is not operated, as shown in FIG. 1, the loop is closed. When the opening and closing lever mechanism 32 is operated, as shown in FIG. 5, the loop is opened.

The toggle-jointed link 30 has a pair of semicircular members 34 forming a circle when combined with each other, and two lugs 35 outwardly protruding away from the loop and connected with the semicircular members 34. By applying an external force to reduce a space between two lugs, the semicircular members 34 are opened by leverage. Namely, it can be said that the supporting means in this embodiment has a clip-on mechanism.

As shown in FIG. 1, a lever 36 is provided for one of the lugs 35 and is extended to connect the two lugs 35. Also, a bendable joint 37 is provided between the two lugs 35. By providing such an opening and closing lever mechanism 32, as shown in FIG. 5, it is possible to easily open and close the semicircular members 34 only by operating the lever 36.

In this embodiment, by pressing the lever 36 against the semicircular members 34, the bendable joint 37 in the opening and closing lever mechanism 32 is bent in the direction opposite to the semicircular members 34. The bendable joint 37 is connected to one of the semicircular members 34 without the lever 36, by an elastic member such as the spring 33. Therefore, as shown in FIG. 5, the lever 36 is maintained outwardly of the semicircular member 34 by the spring 33, unless the lever 36 is pressed against the semicircular member 34 by an operational rail 26. As shown in FIG. 1, the semicircular members 34 are maintained in the closed position.

Accordingly, the opening and closing lever mechanism 32 of this embodiment forms a toggle mechanism with a fulcrum of the bendable joint 37, and hence, by a doubled force, the opening and closing lever mechanism 32 prevents the semicircular members 34 from opening. In other words, the supporting means in this embodiment having the semicircular members 34 and the opening and closing lever mechanism 32 also serves as locking means to prevent the loop from opening.

Thus, when the toggle mechanism is used as the loop-shaped supporting means, it is possible not only to easily open and close the loop by applying an external force to close or open the lugs 35, but also to easily provide the opening and closing lever mechanism 32 in the aforementioned manner. Accordingly, it is possible to make a compact unit which serves as effectively functioning supporting means, opening and closing means, and locking means.

Of course, the opening and closing means and the locking means are not limited to the opening and closing lever mechanism 32, and various kinds of conventional mechanism can be suitably used. The supporting means in the present invention has the opening and closing means to release the support of the axis of the convex half when opened, and while to support the axis when closed, as well as the locking means to maintain the opening and closing means to be closed. The opening and closing means and locking means may be combined with each other as in the case of the opening and closing lever mechanism 32 or may be provided separately. If, as in the case of the opening and closing lever mechanism 32, the supporting means serves as both opening and closing means and locking means, it is possible to obtain such advantages that an increase of the number of parts and an increase of the size of the rolled cone manufacturing apparatus can be avoided.

In addition, in the toggle-jointed link 30 in this embodiment, a link-positioning stopper 38 (positioning and fixing member) is provided where the respective ends of the semicircular members 34 are linked with each other, that is, a part where the loop is cut off. Also, a main link stud 39 is provided at a part opposing to the link-positioning stopper 38 on the semicircular members 34.

Provided that the part where the loop is cut off is referred to as a split part, the respective ends of the semicircular members 34 approach or leave at the split part by opening or closing the semicircular members 34. If the link-positioning stopper 38 is provided, it is possible to lead the ends of the pair of the semicircular members 34 to approach each other on substantially one plane.

Namely, by providing the link-positioning stopper 38, it is possible to fix the split part in place when the toggle-jointed link 30 is closed, thereby more steadily supporting the convex half 20 in closed condition.

In addition, if the link-positioning stopper 38 and the main link stud 39 are placed to face each other, it is possible to fix the axis of the supporting means by these two points of the link-positioning stopper 38 and the main link stud 39.

Thus, in the rolled cone manufacturing apparatus in accordance with the present invention, the supporting means for fixing the convex half 20 may have a loop shape that is openable and closable as the toggle-jointed link 30, and also at least a rolling object (rollers 31 in the above example) is provided. In addition, the toggle-jointed link 30 includes at least one of the opening and closing means, the locking means, and the positioning and fixing member, and preferably includes all of these means. It is possible to use the opening and closing means and the locking means as substantially one means by using a structure such as the opening and closing lever mechanism 32.

Figure 6:
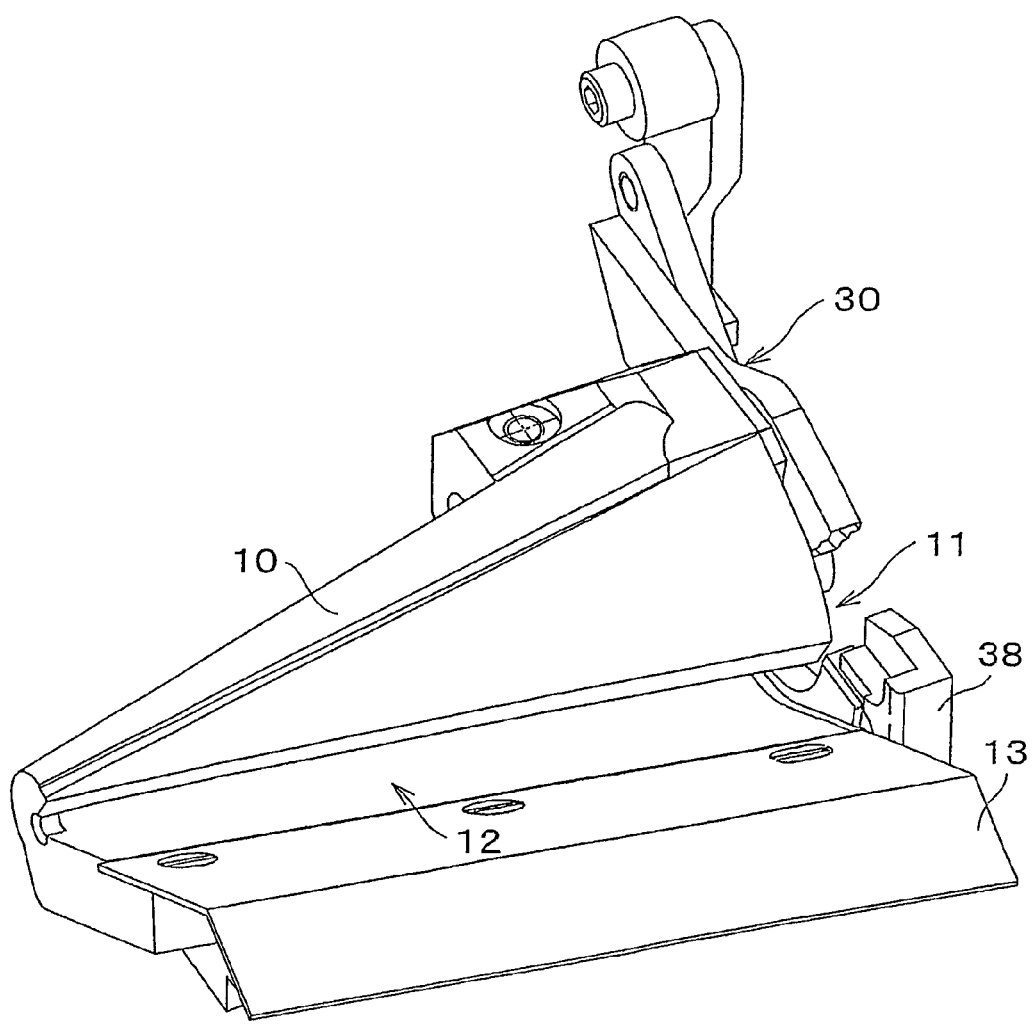
FIG. 6 is a perspective view showing an example of a concave half of the mold shown in FIG. 4.
Figure 7:
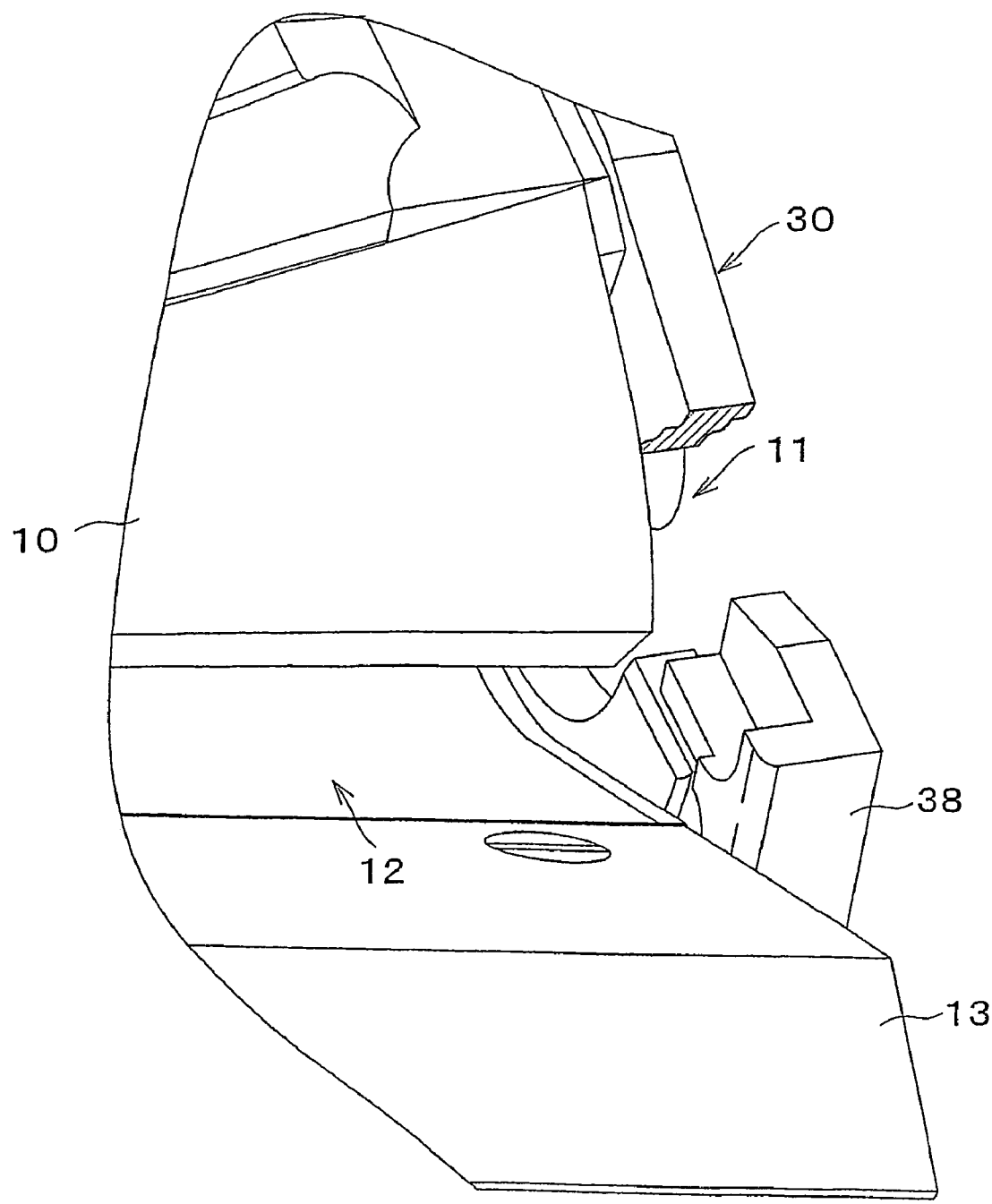
FIG. 7 is a partially enlarged view showing a structure around an opening part of the concave half shown in FIG. 6. For convenience to explain a loop-shaped member and guiding function of a link-positioning stopper, a loop-shaped member of the toggle-jointed link is partially cut out in the figure.

It is preferable that at least a part of the toggle-jointed link 30 and the link-positioning stopper 38 protrudes inwardly from the opening part 11 of the concave half 10 in closed condition, as shown in FIG. 6 and FIG. 7.

Figure 12:
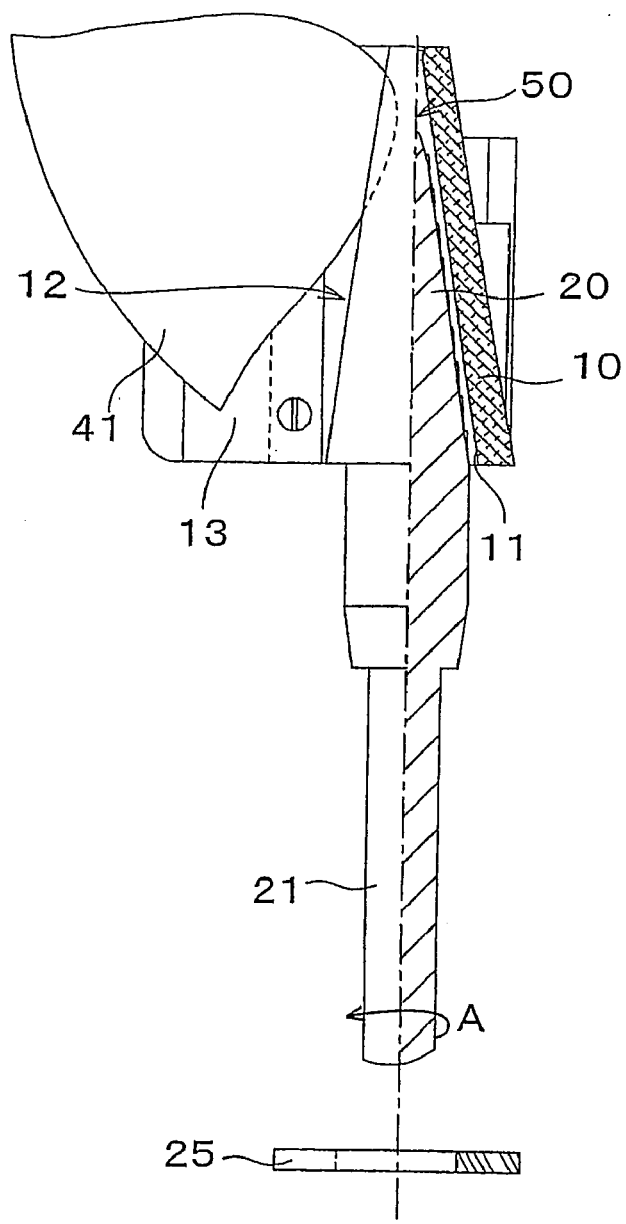
FIG. 12(a) is a fragmentary top cross sectional view of a conventional mold wherein the material sheet is inserted through an inlet.
FIG. 12(b) is a front view seen from the opening part of the concave half in a conventional mold shown in FIG. 12(a).
Figure 12:
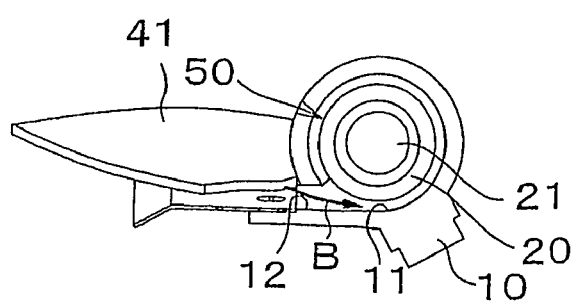
Figure 13:
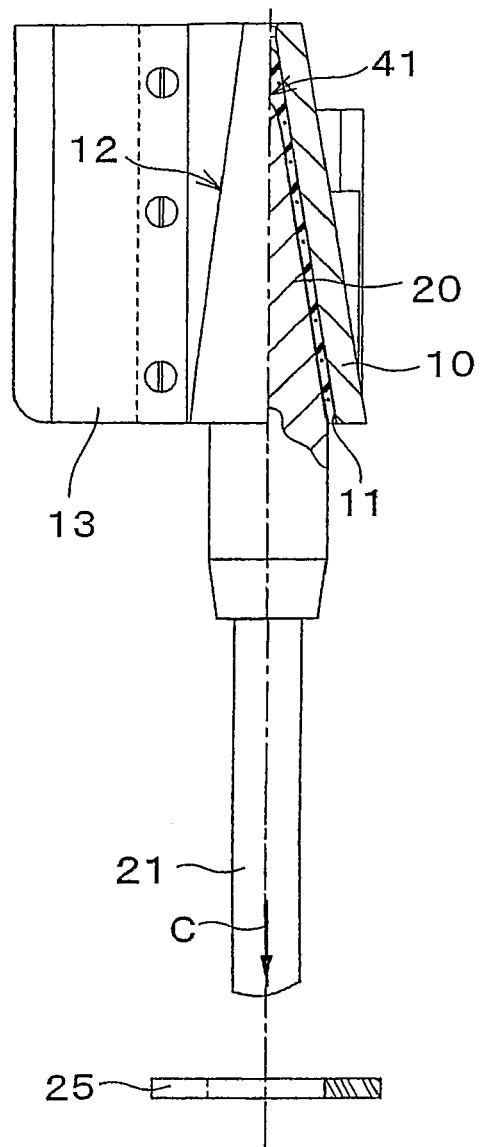
FIG. 13(a) is a fragmentary sectional top view of a conventional mold wherein the material sheet is rolled up.
FIG. 13(b) is a front view seen from the opening part of the concave half in a conventional mold shown in FIG. 13(a).
Figure 13:
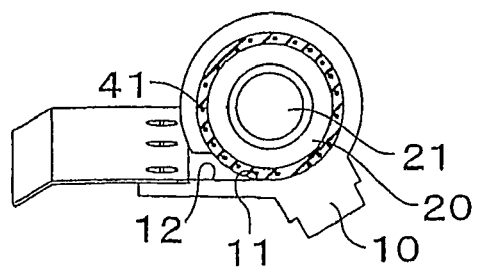
Figure 14:
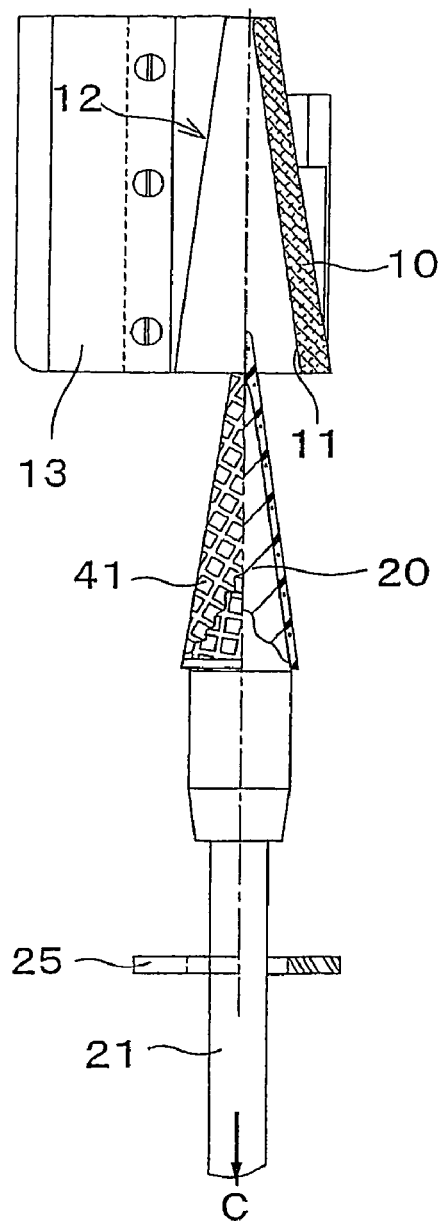
FIG. 14(a) is a fragmentary top cross directional view of a conventional mold showing that the convex half is detached from the concave half.
FIG. 14(b) is a front view seen from the opening part of the concave half in a conventional mold shown in FIG. 14(a).
Figure 14:
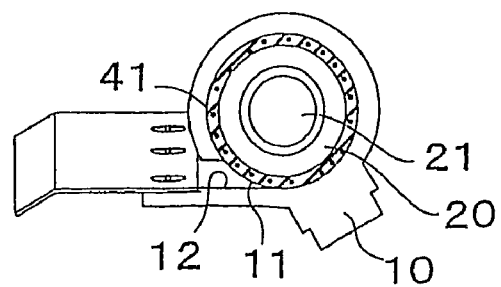

The toggle-jointed link 30 and the link-positioning stopper 38 are fixed adjacent to the opening part 11 of the concave half 10. As shown in FIG. 6, a slit-type inlet 12 is provided at a side of the concave half 10. The material sheet 41 inserted into the concave half 10 through the inlet 12 is rolled up by rotation of the convex half 20 (not shown in FIG. 6) being fitted in the concave half 10, and is held in the cavity 50 between the concave half 10 and the convex half 20 (see FIG. 12 and FIG. 13).

Though the material sheet 41 should be exactly rolled up by rotation of the convex half 20, the material sheet 41 inserted through the inlet 12 may be slightly misplaced on the occasion of mass production. This causes slight misplacement of the roll-up position, and as shown in FIG. 3(b), a poor rolled cone 40 with an uneven rim on an open edge 42 may be produced.

It is possible to prevent this misplacement of the roll-up position and improve moldability of the rolled cone 40 by providing a guiding member on the opening part 11 side of the concave half 10 in order to determine in which direction the material sheet 41 enters into the concave half 10. Moreover, since the supporting means is provided on the opening part 11 side of the concave half 10, it is possible to prevent the members of the supporting means used as the guiding member from increasing in number.

In the rolled cone manufacturing apparatus in accordance with the present invention, the supporting means has a loop shape such as the toggle-jointed link 30. Therefore, as shown in FIG. 7, the supporting means entirely covers the periphery of the opening part 11 of the concave half 10, i.e. the surrounding of the inlet 12, thereby effectively functioning as a guiding member just after roll-up of the material sheet 41 starts. In the result, it is possible to determine in which direction the material sheet 41 enters into the concave half 10, before positioning the material sheet 41 by the claws 24 provided for the convex half 20, and thus it is possible to further improve moldability of the rolled cone 40.

Accordingly, the toggle-jointed link 30 as the supporting means in the present invention serves as the opening and closing means, locking means, and guiding member to bring the material sheet into the concave half. The toggle-jointed link 30 with a plurality of functions gives advantages of preventing the members from increasing in number and downsizing the rolled cone manufacturing apparatus.

In addition, as shown in FIG. 6 and FIG. 7, since the link-positioning stopper 38 is provided near the inlet 12 and effectively functions as the guiding member, moldability of the rolled cone 40 is further improved.

Of course, the guiding member may be provided independently of the toggle-jointed link 30 and the link-positioning stopper 38. Namely, in the present invention, the guiding member is not particularly limited if it is provided near the inlet 12 and the opening part 11 so that it covers a periphery of the opening part 11 and determine in which direction the material sheet 41 enters into the concave half 10. Therefore, for example, the following arrangement may be implemented: the guiding member is provided independently of the toggle-jointed link 30 and a part of the toggle-jointed link 30 functions as the guiding member. In other words, at least a part of the toggle-jointed link 30 may function as the guiding member.

The rolled cone manufacturing apparatus in accordance with the present invention is not particularly limited and may include any features on condition that at least the roll-up mold including the toggle-jointed link 30 is included. More particularly, in addition to the mold, a rotating part such as a motor that rotates the convex half 20, a convex transferring part that causes the convex half 20 to fit in or detach from the concave half 10, an opening and closing lever for operating the opening and closing lever mechanism 32 of the toggle-jointed link 30 may be used, without particular limitations. Means that includes the mold and carries out the second molding (rolling up) of the material sheet 41 into the rolled cone 40 is referred to as a second molding part (or roll-up part).

Figure 11:
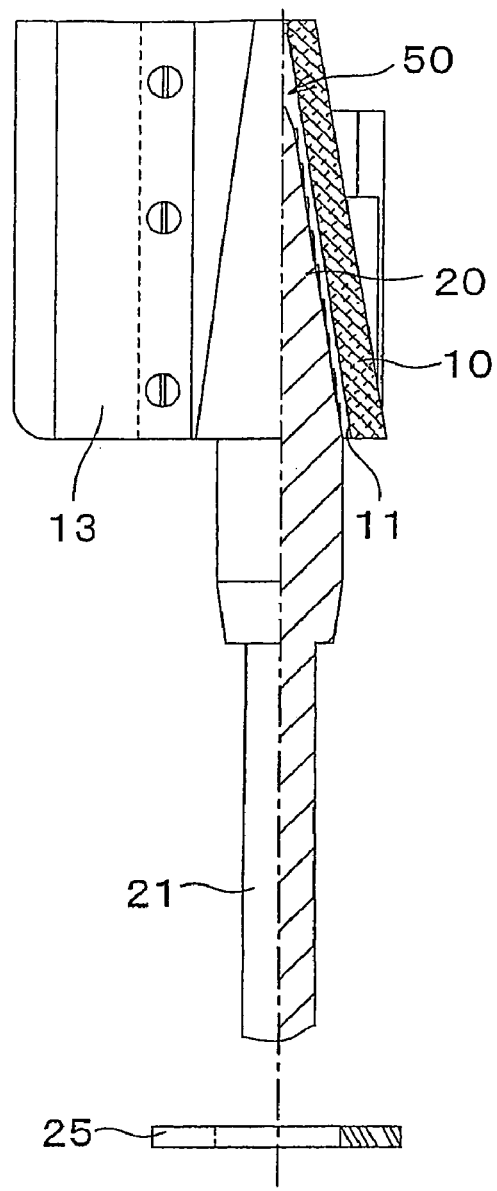
Figure 11:
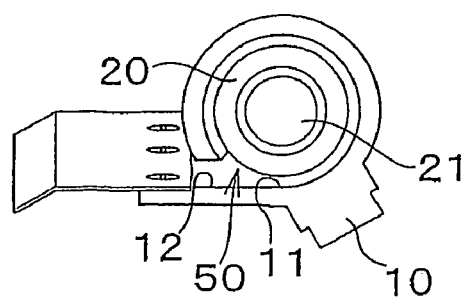
Figure 15:
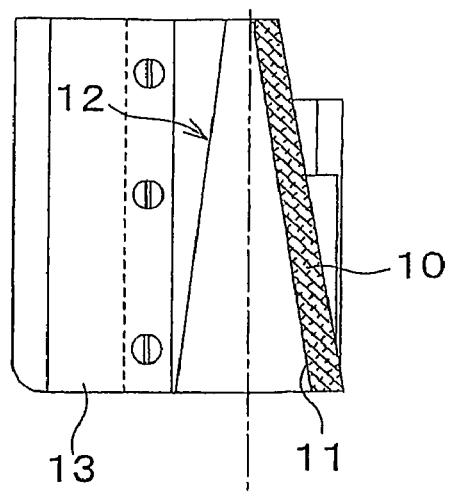
FIG. 15(a) is a fragmentary top cross sectional view of a conventional mold showing that a rolled cone is removed from the detached convex half.
FIG. 15(b) is a front view seen from the opening part of the concave half in a conventional mold shown in FIG. 15(a).
Figure 15:
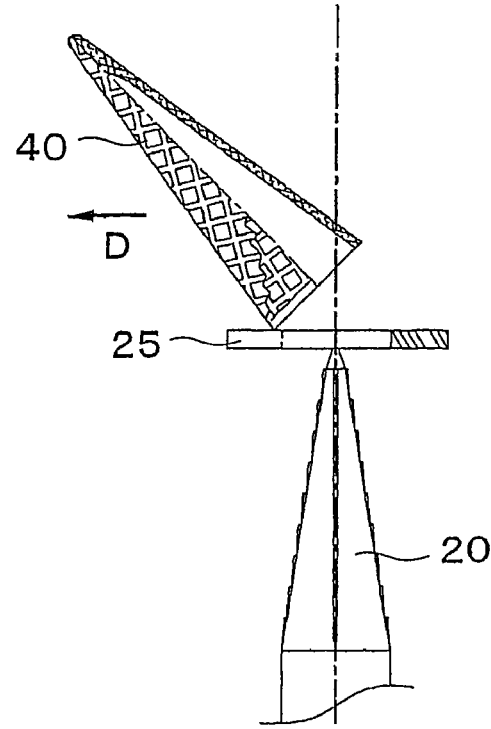
Figure 15:
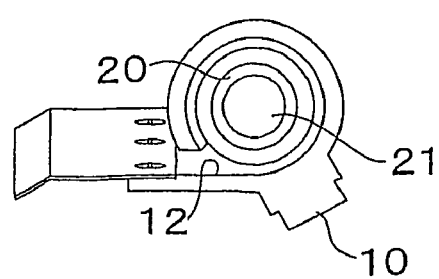

In the second molding part, a detachment frame having almost the same inner diameter as that of the cylindrical part 23 of the convex half 20 and the fitting part 22 may be provided along a moving direction of the convex half 20 (see FIG. 11(*a*) to FIG. 15(*a*)). The detachment frame detaches the rolled cone 40 having been rolled up outside the fitting part 22 of the convex half 20, by causing the convex half 20 after the roll-up to pass through the frame. Of course, detaching the rolled cone 40 may be carried out in accordance with an arrangement other than the above.

Moreover, in addition to the second molding part, a first molding part (sheet molding part) that molds the raw materials into the material sheet 41 and a transporting part that transports the material sheet 41 molded at the first molding part to a second molding part may be included. In addition, a controlling part that links and operates the first rotator through the transporting part and the second molding part may be provided. Thus, it is possible to manufacture the rolled cones 40 automatically and continuously, thereby making the quality rolled cone 40 efficiently.

The rotating part and convex transferring part of the second molding part, the first molding part, the transporting part, and the controlling part are not limited to any particular arrangements so that conventionally-arranged members can be used. Since the rolled cone manufacturing apparatus in accordance with the present invention has at least the mold, other means including the rolling part and the moving part of the convex half or the first molding part and the transporting part may be combined with the mold and the second molding part and form a single unit, or may be provided separately.

It is preferable that the convex half 20 is rotatable when the toggle-jointed link 30 is in closed condition, no matter whether the operation is automatically controlled by the controlling part or not. Also, it is preferable that the convex half 20 can move along the axis when the toggle-jointed link 30 is in open condition. The direction along the axis is the direction of fitting or detaching the concave half 10.

Thus, it is possible to rotate and move the convex half 20 at a suitable timing, when with the rotation and movement are caused to be in sync with the opening and closing of the toggle-jointed link 30. This makes it possible to prevent damage caused by contact of the convex half 20 with the concave half 10.

In the present embodiment and the embodiments 2 and 3 described below, the convex half 20 is fixed to be exposed from the opening part 11 of the concave half 10, when being fitted in the convex half 20, but the present invention is not limited to this. For example, the spindle shaft 21 may be fixed rotatably by the supporting means if the axis of the concave half 10 is properly aligned with the axis of the convex half 20. Therefore, the "convex half" of the present invention may include the spindle shaft 21 being integrated with the convex half 20.

Embodiment 2

Another embodiment of the present invention is explained below referring to figures. The present invention is not limited to this embodiment. For convenience of explanation, the same number is shown for the member having the same function as the member used in the above embodiment 1 with the explanation left out.

In the embodiment 1, the supporting means is a loop-shaped member as the toggle-jointed link 30, but the present invention is not limited to this. The supporting means need not have a loop shape. In this embodiment, an openable and closable scissors-shaped member is exemplified as the toggle-jointed link 30.

More particularly, the rolled cone manufacturing apparatus in accordance with the present invention has the same structure as that of the embodiment 1. As schematically shown in FIG. 8, the supporting means is the scissors-shaped member 60 pinching an outer periphery of the convex half 20.

Figure 8:
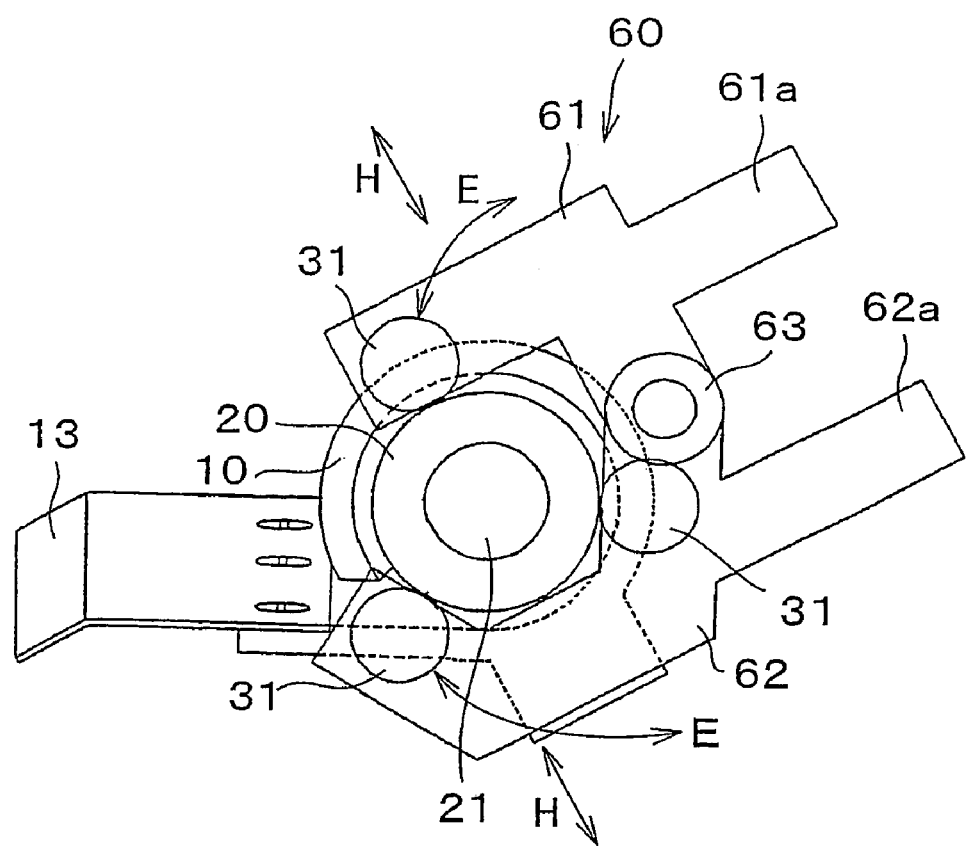
FIG. 8 is a front schematic illustration showing a scissors-shaped member (supporting means) provided in a rolled cone manufacturing apparatus in accordance with another embodiment in the present invention.

In the example shown in FIG. 8, the scissors-shaped member 60 has a structure such that two arms (scissors) 61 and 62 are fixed by a scissors-fixing stud 63 in an openable/closable manner. The arm 61 has a single-bent shape with the roller 31 at the tip. The arm 62 has double-bent shape and is equipped with the rollers 31 at the tip and at the bottom near the scissors-fixing stud 63, respectively. In addition, the arms 61 and 62 have the respective lugs 61*a* and 62*a*. By exerting an external force in such a manner as to cause the lugs 61a and 62a to get close to each other, the arms 61 and 62 are released in the direction of Arrow E.

In the scissors-shaped member 60, three rollers 31 contacting the surface of the convex half are provided inside the scissors, that is, on the internal sides of the arms 61 and 62. It is thus possible to effectively prevent misalignment of the axes of the respective halves as in the embodiment 1, as the convex half 20 is supported by pinching the same by the arms 61 and 62. It is thus possible to stabilize the roll-up condition of the material sheet and prevent the contact and damage of the halves. In result, it is possible to effectively prevent misalignment of the respective axes of the concave half and the convex half and to efficiently produce quality rolled cones.

The structure of the arms 61 and 62 is not particularly limited on condition that the outer periphery of the convex half 20 is supported on more than three points. In addition, the basic structure of the arms 61 and 62 is the same as that of the toggle-jointed link 30 in the embodiment 1. Therefore, the toggle-jointed link 30 can be seen as a scissors-shaped member having loop-shaped arms. By contraries, the scissors-shaped member 60 in this embodiment can be seen as a substantially loop-shaped supporting member. Therefore, the scissors-shaped member 60 may include locking means, openable and closable means, and positioning and fixing member as the embodiment 1, or the scissors-shaped member 60 may serve as a guiding member.

The number of rollers 31 of the arms 61 and 62 of the above scissors-shaped member 60, i.e. the number of rolling objects is not less than three with no upper limit. As mentioned above, by determining three points, the axis of the convex half 20 is fixed on one point. It is thus possible to ensure steady support by supporting the periphery of the cylindrical part of the convex half 20 with three rolling objects.

In this embodiment, the arms 61 and 62 are fixed by the scissors-fixing stud 63 in an openable/closable manner. The scissors-shaped member 60 is, however, not limited to this structure. For example, the arms 61 and 62 may be moved in parallel in the direction of Arrow E, with the convex half 20 placed therebetween.

Embodiment 3

Still another embodiment of the present invention is explained below referring to figures. The present invention is not limited to this embodiment. For convenience of explanation, the same number is shown for the member having the same function as the member used in the above embodiment 1 or 2 with the explanation left out.

In the above embodiments 1 and 2, the supporting means pinches an outer periphery of the convex half 20 with the arm-shaped members, such as the toggle-jointed link 30 and the scissors-shaped member 60. The present invention is not limited to this structure, and arranged in such a manner that the cylindrical part 23 of the convex half 20 is pushed onto the axis on at least three points, by an openable/closable member. Descriptions are given in this embodiment by exemplifying supporting means which is arranged to be movable to contact on or detach from an outer periphery of the convex half 20 and also pushes the convex half 20 onto the axis in contact condition.

Figure 9:
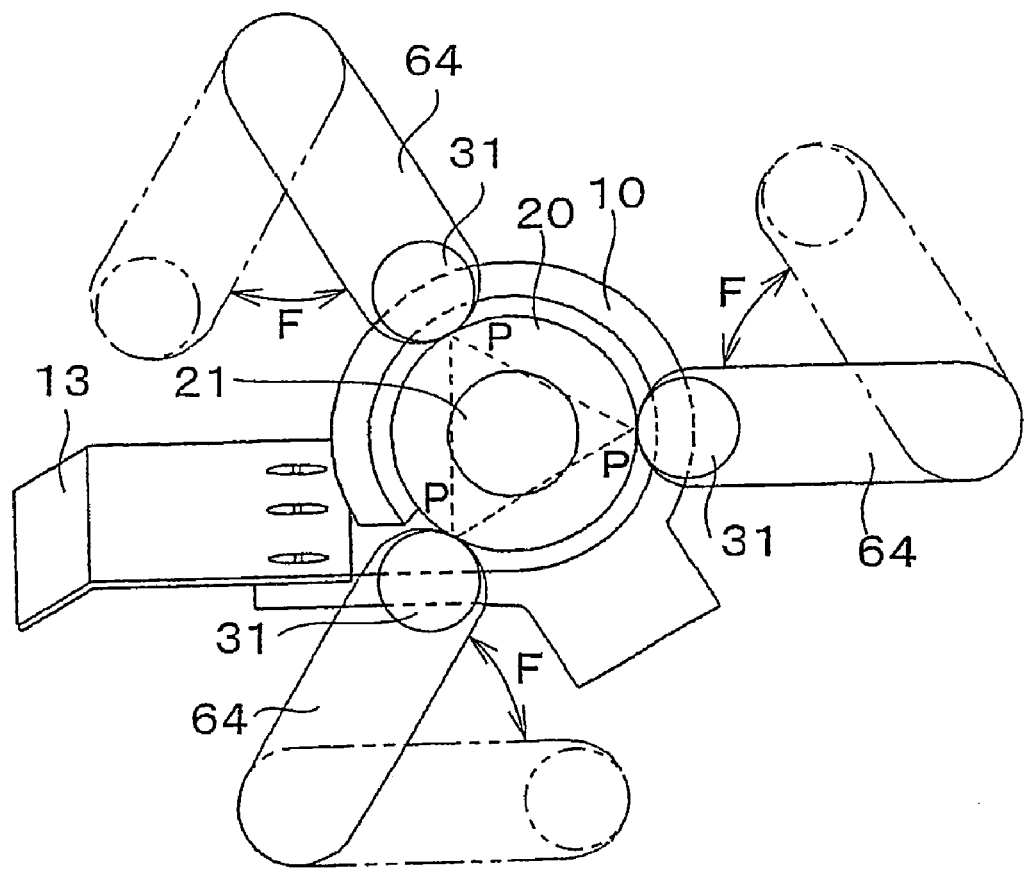
FIG. 9 is a front schematic illustration showing three lever-type members (supporting means) provided in a rolled cone manufacturing apparatus in accordance with still another embodiment in the present invention.

More particularly, for example, in the rolled cone manufacturing apparatus in accordance with this embodiment, a lever-shaped member (means for fixing an axis) 64 as shown in FIG. 9 is provided as the supporting means.

The lever-shaped members 64 are substantially bar-shaped as schematically shown in FIG. 9, and their longer sides surround the outer periphery of the convex half 20. One end of the lever-shaped member 64 is fixed while the other end is movable. By moving the other end to contact on the outer periphery of the convex half 20, the lever-shaped members 64 push the outer periphery.

Figure 10:
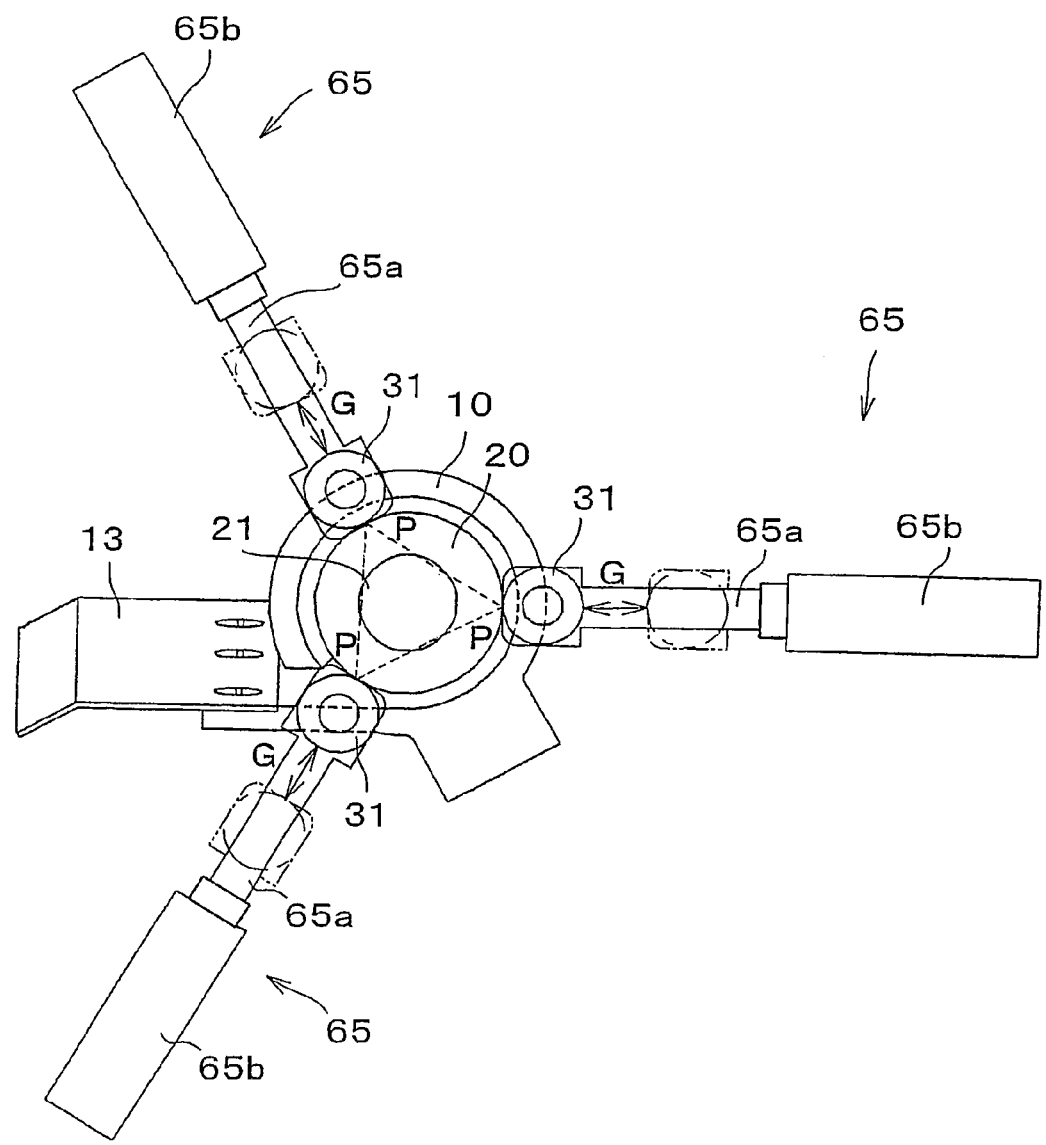
FIG. 10 is a front schematic illustration of a structure of three radial linear actuators (supporting means) provided in a rolled cone manufacturing apparatus in accordance with still another embodiment in the present invention.

As another example, the rolled cone manufacturing apparatus in accordance with this embodiment is arranged such that radial linear actuators 65 (means for fixing an axis) are provided as the supporting means, as shown in FIG. 10.

The radial linear actuators 65 are substantially bar-shaped as schematically shown in FIG. 10. However, unlike the lever-shaped members 64, the radial linear actuators 65 are provided on the outer periphery of the convex half 20 so as to form a radial shape when viewed from the axis of the convex half 20. Each of these radial linear actuators 65 has a structure such that an operating part 65a extends from a fixed main part 65b. By extending the tip of the operating part 65a in the direction of Arrow G to contact the outer periphery of the convex half 20, the radial linear actuators 65 push the outer periphery of the convex half 20 on at least three points.

In both the lever-shaped members 64 and the radial linear actuators 65, it is very preferable that the rolling objects such as the rollers 31 are provided on respective parts (the other end of the lever-shaped member 64 or the tip of the operating part 65a) for contacting the convex half 20, as the embodiment 1 and 2. Also, the rolled cone manufacturing apparatus in accordance with this embodiment has the same structure as that explained in embodiment 1 or 2, except for the supporting means.

The positions where the lever-shaped members 64 or the radial linear actuators 65 are provided, or the position where the cylindrical part 23 is supported by the supporting means in the embodiment 1 or 2 is not randomly determined. The position is determined in such a manner as to form a polygon encompassing the axis of the convex half 20 by connecting the fixing positions P at which the contact with the periphery of the convex half 20 is made. Alternatively, when the supporting means includes a sliding bearing, the position is determined in such a manner as to form either a circle around the axis or a closed curved figure by connecting arcs centering on the axis.

For example, in the case of FIG. 9 or FIG. 10, the positions of three lever-shaped members 64 or the radial linear actuators 65 are determined in such a manner as to form a regular triangle (shown by a doted line) by connecting the fixing positions P, i.e. an angle between two fixing positions P is 120° at the axis of the convex half 20.

If the positions of the lever-shaped members 64 or the radial linear actuators 65 are arranged in such a manner as to form a figure by connecting the fixing positions P which does not encompass the axis of the convex half 20, the balance of forces for pushing the convex half 20 onto the axis, which are exerted by the lever-shaped members 64 or the radial linear actuators 65, is disrupted, and this makes it impossible to support the convex half 20 rotatably. Therefore, the positions of the lever-shaped members 64 or the radial linear actuators 65 are preferably determined as above.

In the present invention, the cylindrical part 23 of the convex half 20 is pushed onto the axis on at least three points. It is needless to say that these three points are not points in mathematical sense but are those indicating the physical layout. In other words, for example, if the roller members (e.g. rollers 31) extending in the rotating direction are used as rolling objects, as shown in FIG. 4, the roller members contact the cylindrical part 23 at "lines". It is in this case obvious that the supporting means contacts the cylindrical part 23 at a plurality of positions and supports the convex half 20 rotatably. This is also true in case that the supporting means is the sliding bearing.

Therefore, "three points" referred in the present invention do not just indicate dots. In other words, the supporting means in the present invention has a structure that the outer periphery of a part of the convex half 20 protruding from the concave half 10 (e.g. cylindrical part 23) is supported at least from three directions.

As mentioned above, the rolled cone manufacturing apparatus in accordance with the present invention has the supporting means to align the axis of the concave half with the axis of the convex half, and moreover strengthens the bearing function of the supporting means. It is thus possible to effectively avoid misalignment of the axes, to stabilize roll-up condition, and to avoid contact and damage of the halves. In result, the rolled cone manufacturing apparatus in accordance with the present invention effectively avoids misalignment of the respective axes of the concave half and the convex half, thereby efficiently producing quality rolled cones.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The rolled cone manufacturing apparatus in accordance with the present invention has the supporting means, thereby avoiding misalignment of the respective axes of the concave half and the convex half, and efficiently producing quality rolled cones. In result, the rolled cone manufacturing apparatus can be suitably used not only for production of rolled cones as edible containers to serve various frozen desserts and confectioneries but also for various needs for rolling up a sheet material into a rough conical shape, for example, for food manufacturing and processing and other similar fields.

The invention claimed is:

1. A rolled cone manufacturing apparatus, comprising:
a concave half and a convex half which form a cavity inside when combined with each other, a cross section of the cavity having a circular shape in a direction orthogonal to axes of the concave half and the convex half; and
supporting means which rotatably supports the convex half, on condition that the axis of the concave half is aligned with the axis of the convex half, said supporting means being openable and closable, and pushing, on at least three points that are spaced apart from the cavity, an outer periphery of a part of the convex half protruding from the concave half onto the axis, when said supporting means is closed.

2. The rolled cone manufacturing apparatus according to claim 1, wherein, the supporting means includes (i) opening and closing means for, when opened, releasing support of the axis of the convex half, while, when closed, supporting the axis of the convex half, and (ii) locking means for keeping the opening and closing means closed.

3. The rolled cone manufacturing apparatus according to claim 1, wherein, positions of supporting points of the supporting means are determined in such a manner as to form either (I) a polygon encompassing the axis of the convex half, by connecting points where the supporting means contacts an outer periphery of a part of the convex half protruding from the concave half, or, (II) when the supporting means functions as a sliding bearing, either a circle around the axis or a closed curved figure by connecting arcs centering on the axis.

4. The rolled cone manufacturing apparatus according to claim 1, wherein rolling objects are provided on respective supporting points of the supporting means.

5. The rolled cone manufacturing apparatus according to claim 1, wherein the convex half is rotatable when the supporting means is closed, while the convex half is movable toward the axis when the supporting means is open.

6. The rolled cone manufacturing apparatus according to claim 1, wherein the concave half has an opening part through which the convex half is fitted in, said supporting means partly protruding inwardly of the opening part when said supporting means is closed.

7. The rolled cone manufacturing apparatus according to claim 1, wherein the concave half has an opening part through which the convex half is fitted in, a slit-type inlet connected to the cavity is formed at a side of the concave half, and a guiding member to cover a surrounding of the opening part is provided around the inlet and the opening part.

8. The rolled cone manufacturing apparatus according to claim 1, wherein, when cross sections of the concave half and the convex half are circular in a direction orthogonal to the axes of the concave half and the convex half, the concave half and the convex half are conical-shaped, truncated-cone shaped, or cylinder-shaped.

9. The rolled cone manufacturing apparatus according to claim 1, wherein the supporting means is a loop-shaped member which is openable and closable.

10. A rolled cone manufacturing apparatus, comprising:
a concave half and a convex half which form a cavity inside when combined with each other, a cross section of the cavity having a circular shape in a direction orthogonal to axes of the concave half and the convex half; and
supporting means which rotatably supports the convex half, on condition that the axis of the concave half is aligned with the axis of the convex half, said supporting means being openable and closable, and pushing, on at least three points, an outer periphery of a part of the convex half protruding from the concave half onto the axis, when said supporting means is closed, wherein the supporting means is a loop-shaped member which is openable and closable, and each of the supporting means is a link mechanism including a toggle mechanism, said link mechanism serving as opening and closing means, locking means, and a guiding member for guiding a material sheet into the concave half.

11. A rolled cone manufacturing apparatus, comprising:
a concave half and a convex half which form a cavity inside when combined with each other, a cross section of the cavity having a circular shape in a direction orthogonal to axes of the concave half and the convex half; and
supporting means which rotatably supports the convex half, on condition that the axis of the concave half is aligned with the axis of the convex half, said supporting means being openable and closable, and pushing, on at least three points, an outer periphery of a part of the convex half protruding from the concave half onto the axis, when said supporting means is closed, wherein the supporting means is a loop-shaped member which is openable and closable, and the supporting means includes, provided that a part where the loop of the supporting means is cut off is referred to as a split part, a positioning and fixing member for positioning and fixing the split part in place, when the supporting means is closed, said positioning and fixing member serving as a guiding member when the material sheet is brought into the concave half.

* * * * *